US012725420B2

(12) United States Patent
Liu

(10) Patent No.: US 12,725,420 B2
(45) Date of Patent: Sep. 1, 2026

(54) IMAGE MODE APPLICATION METHOD AND SURVEILLANCE APPARATUS

(71) Applicant: VIVOTEK INC., New Taipei City (TW)

(72) Inventor: Cheng-Chieh Liu, New Taipei City (TW)

(73) Assignee: VIVOTEK INC., New Taipei City (TW)

( * ) Notice: Subject to any disclaimer, the term of this patent is extended or adjusted under 35 U.S.C. 154(b) by 0 days.

(21) Appl. No.: 18/827,891

(22) Filed: Sep. 9, 2024

(65) Prior Publication Data

US 2025/0095376 A1 Mar. 20, 2025

(30) Foreign Application Priority Data

Sep. 14, 2023 (TW) ................................ 112135046

(51) Int. Cl.

| | |
|---|---|
| ***G06V 20/52*** | (2022.01) |
| ***G06V 10/25*** | (2022.01) |
| ***G06V 10/44*** | (2022.01) |
| ***G06V 10/762*** | (2022.01) |
| ***G06V 40/16*** | (2022.01) |
| ***G06V 40/20*** | (2022.01) |

(52) U.S. Cl.

CPC .............. *G06V 20/52* (2022.01); *G06V 10/25* (2022.01); *G06V 10/44* (2022.01); *G06V 10/762* (2022.01); *G06V 40/168* (2022.01); *G06V 40/20* (2022.01)

(58) Field of Classification Search

CPC ...... G06V 10/25; G06V 10/44; G06V 10/762; G06V 20/52; G06V 40/20; G06V 40/168

See application file for complete search history.

(56) References Cited

U.S. PATENT DOCUMENTS

| | | | | |
|---|---|---|---|---|
| 9,286,706 | B1 * | 3/2016 | Krishnaswamy | G06V 40/172 |
| 2007/0013776 | A1 * | 1/2007 | Venetianer | H04N 5/76 348/E7.086 |
| 2012/0189207 | A1 * | 7/2012 | Doretto | G06V 10/446 382/190 |
| 2018/0131987 | A1 * | 5/2018 | Kim | H04N 21/2747 |
| 2023/0245535 | A1 * | 8/2023 | Xiao | G06V 20/52 382/103 |
| 2023/0306489 | A1 * | 9/2023 | Kong | G06N 5/04 |
| 2024/0054596 | A1 * | 2/2024 | Blum-Oeste | G06T 11/60 |
| 2024/0076602 | A1 * | 3/2024 | Jolie | G06T 7/248 |

FOREIGN PATENT DOCUMENTS

| | | | | |
|---|---|---|---|---|
| KR | 102748314 B1 | * | 12/2024 | H10H 20/824 |
| WO | WO-2020082258 A1 | * | 4/2020 | G06F 18/00 |

* cited by examiner

*Primary Examiner* — Peet Dhillon

(74) *Attorney, Agent, or Firm* — Winston Hsu

(57) ABSTRACT

An image mode application method is applied to a surveillance apparatus with an operation processor. The operation processor receives an image stream having a first detection image and a second detection image generated in sequence. The image mode application method includes detecting a first feature of a first target object within the first detection image, switching an application mode of the surveillance apparatus from a first mode to a second mode in accordance with a detection result of the first feature, detecting a second feature of the first target object within the second detection image, determining whether the second feature conforms to the first feature, and switching the application mode from the second mode to the first mode when the second features conforms to the first feature.

18 Claims, 8 Drawing Sheets

IMAGE MODE APPLICATION METHOD AND SURVEILLANCE APPARATUS

BACKGROUND OF THE INVENTION

1. Field of the Invention

The present invention relates to an image mode application method and a surveillance apparatus, and more particularly, to an image mode application method of switching an application mode based on new features of the object and a related surveillance apparatus.

2. Description of the Prior Art

The smart recording technology of a conventional surveillance apparatus includes motion-based detection recording technology and object-based detection recording technology. The motion-based detection recording technology uses a high standard mode (such as high resolution, high image quality or high frame rate) to store and transmit surveillance images to the backend surveillance management system when a moving object is detected in the surveillance images, for following applications (such as displaying the surveillance images or sending an alarm); if the moving object is not detected in the surveillance images, the motion-based detection recording technology uses a normal standard mode (such as low resolution, low image quality or low frame rate) to store the transmit the surveillance images. The object-based detection recording technology uses the high standard mode to store and transmit the surveillance images when a specific object is detected in the surveillance images; if the specific object is not detected in the surveillance images, the object-based detection recording technology uses the normal standard mode to store the transmit the surveillance images. If the specific object is continuously stayed in the surveillance images, the object-based detection recording technology switches the surveillance images from the normal standard mode to the high standard mode. Therefore, the conventional motion-based detection recording technology and the conventional object-based detection recording technology causes drawbacks of unnecessary image transmission, waste of storage space required to store the surveillance images, and sending unnecessary alarms because setting conditions for the recording cannot meet the complex object behavior.

SUMMARY OF THE INVENTION

The present invention provides an image mode application method of switching an application mode based on new features of the object and a related surveillance apparatus for solving above drawbacks.

According to the claimed invention, an image mode application method is applied to a surveillance apparatus with an operation processor. The operation processor receives an image stream having a first detection image and a second detection image generated in sequence. The image mode application method includes detecting a first feature of a first target object within the first detection image, switching an application mode of the surveillance apparatus from a first mode to a second mode in accordance with a detection result of the first feature, detecting a second feature of the first target object within the second detection image, determining whether the second feature conforms to the first feature, and switching the application mode from the second mode to the first mode when the second features conforms to the first feature.

According to the claimed invention, a surveillance apparatus includes an operation processor adapted to acquire an image stream having a first detection image and a second detection image generated in sequence, and execute the image mode application method as mentioned above.

The image mode application method and the surveillance apparatus of the present invention can analyze the new feature of the target object within the detection image to decide the application mode of the image stream. If the detection image has the same target object but no new feature, the alarm is not generated, and the image stream can be set in the normal standard mode to reduce the quantity of the image transmission and to economize the storage space of storing the image. If the detection image has the same target object and the new feature, the alarm is generated, and the image stream can be set in the high standard mode for providing more image information. The present invention can no longer generate the alarm when the detection image has the moving object with the same behavior or the specific object remaining stationary, and switch the image stream into the normal standard and/or shut down the alarm, so as to reduce the quantity of the image transmission and further to economize the storage space of storing the image.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
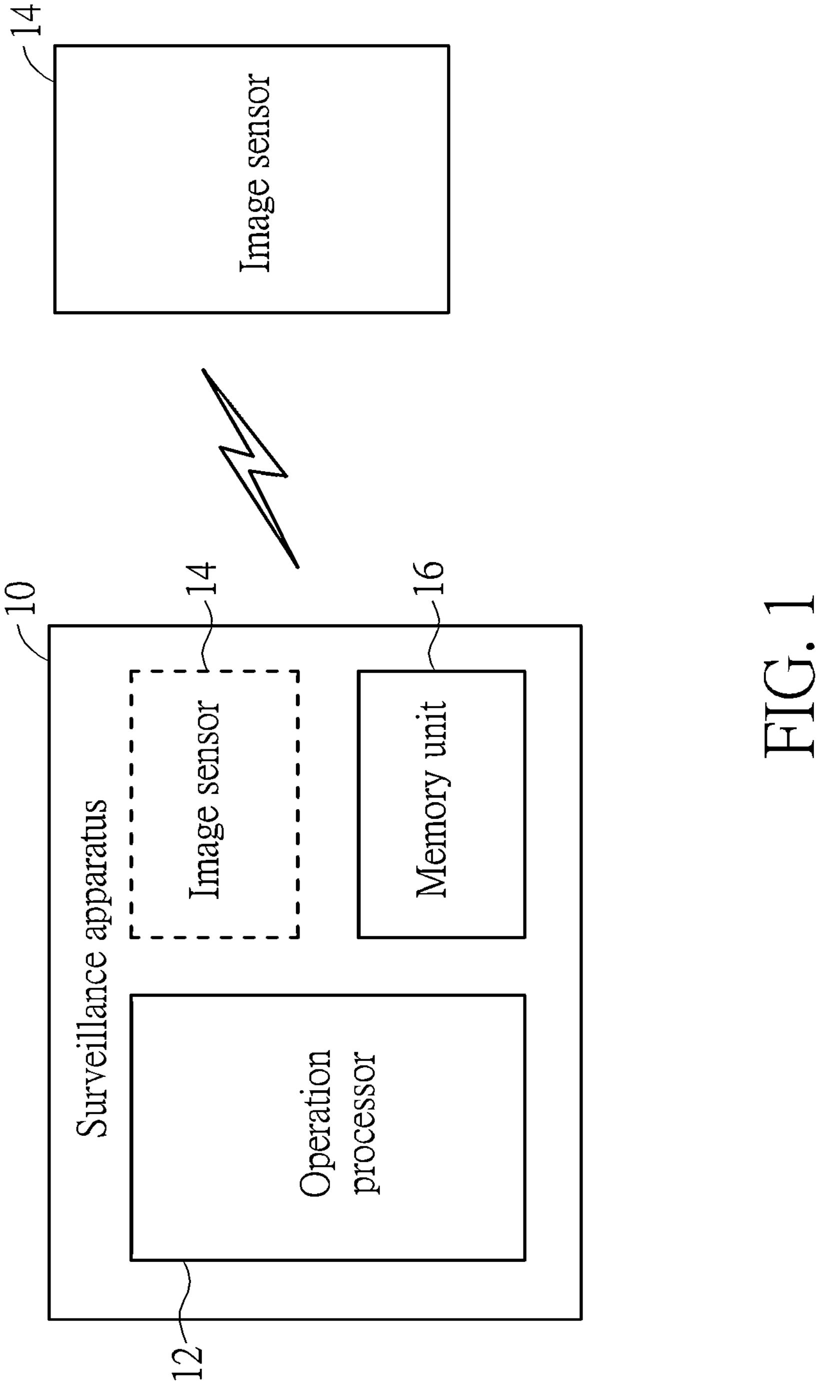
FIG. 1 is a functional block diagram of a surveillance apparatus according to an embodiment of the present invention.

Please refer to FIG. 1. FIG. 1 is a functional block diagram of a surveillance apparatus 10 according to an embodiment of the present invention. The surveillance apparatus 10 can include an operation processor 12 and may optionally have an image sensor 14. The surveillance apparatus 10 can be a surveillance camera having the built-in operation processor 12 and the built-in image sensor 14; the operation processor 12 can process an image stream generated by the image sensor 14, and transmit the processed image stream to an external apparatus. The surveillance apparatus 10 can be a system without an image capturing function, such as a network video recorder or a cloud server; the surveillance apparatus 10 can utilize the operation processor 12 to acquire the image stream generated by an external image capture apparatus for the required image process. Practical application of the surveillance apparatus 10 is not limited to the foresaid embodiments, and depends on a design demand. The image stream can be a single image stream or a plurality of image streams.

Figure 2:
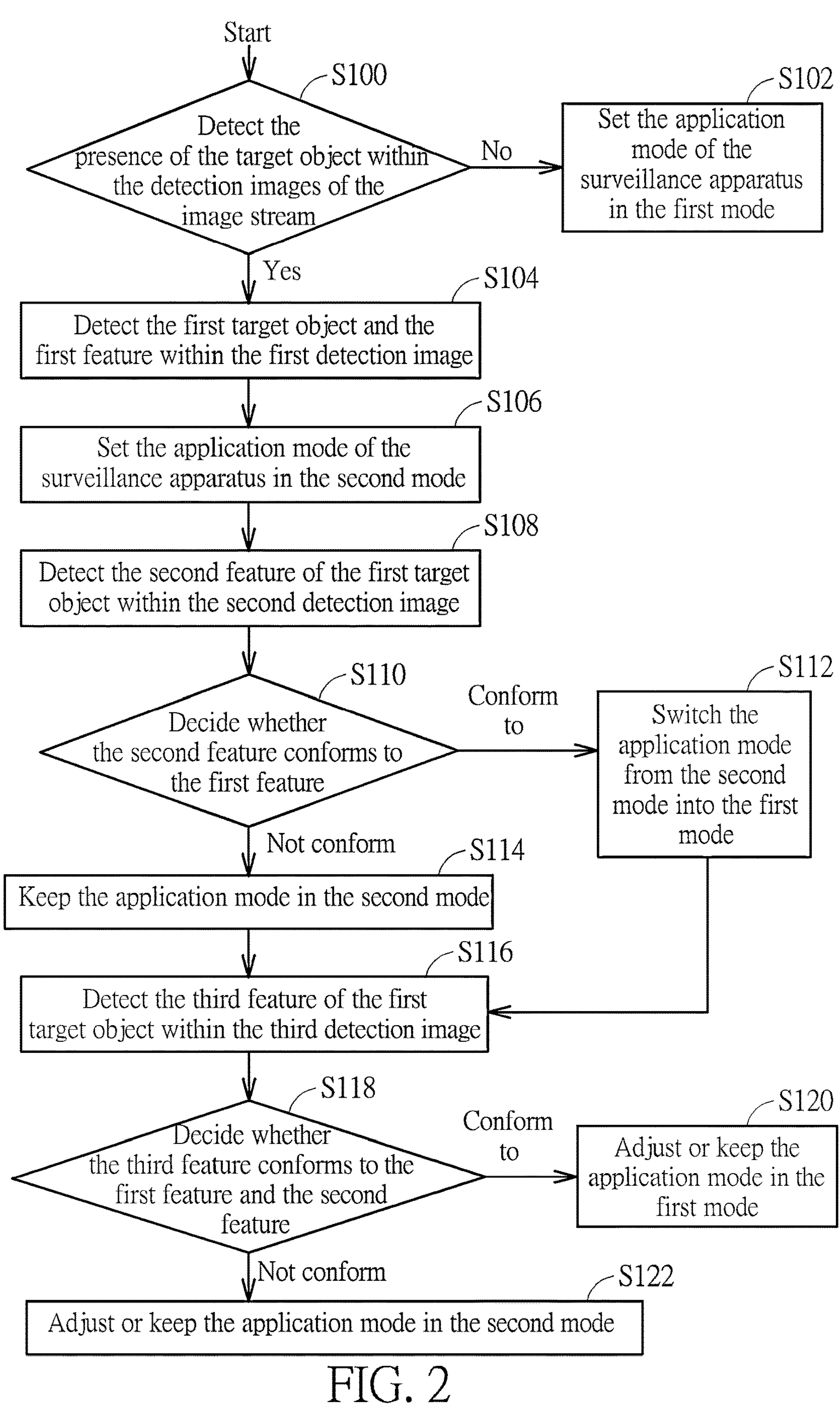
FIG. 2 is a flow chart of an image mode application method according to the embodiment of the present invention.
Figure 3:
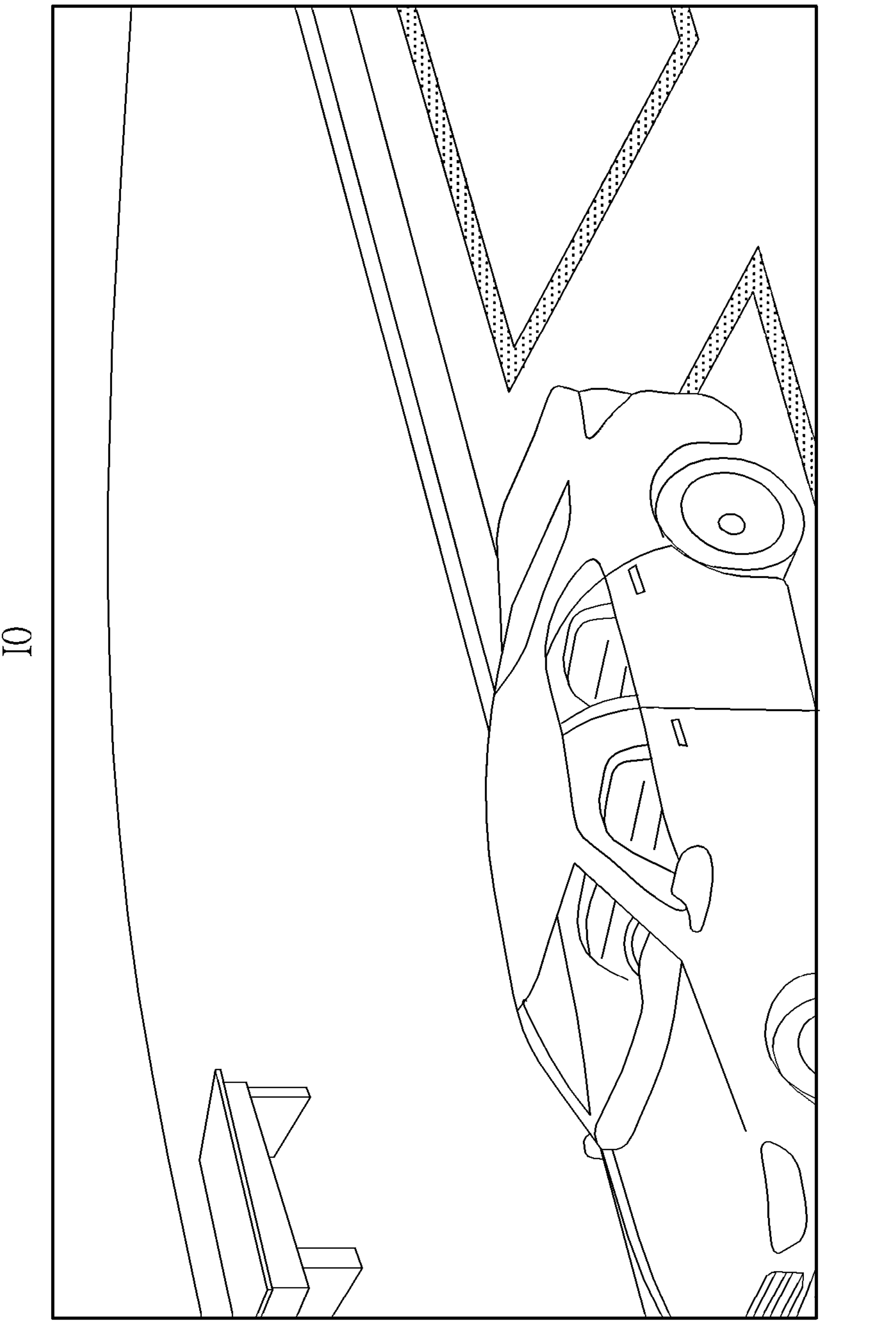
FIG. 3 to FIG. 6 are diagrams of detection image of the image stream acquired by the surveillance apparatus according to the embodiment of the present invention.
Figure 4:
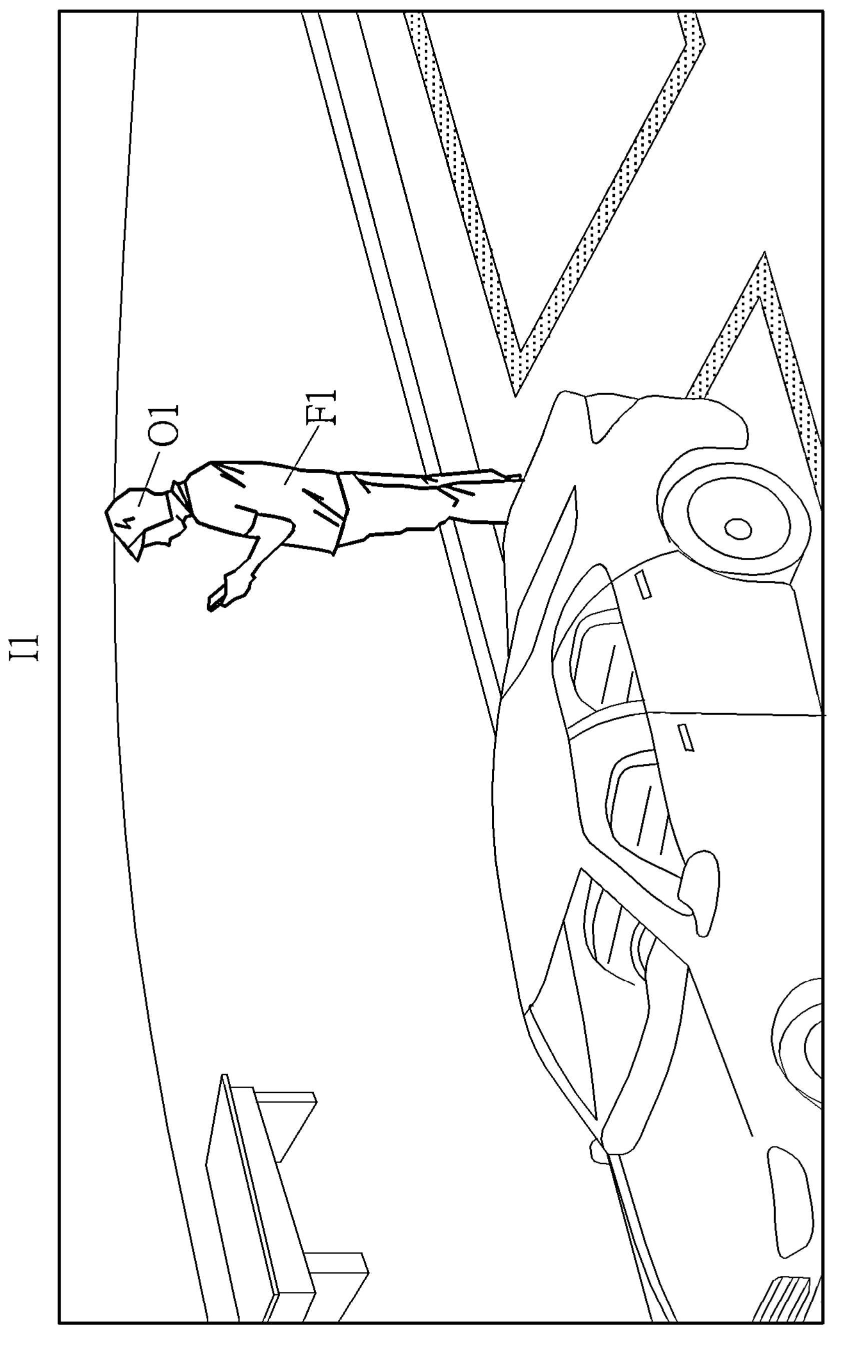
Figure 5:
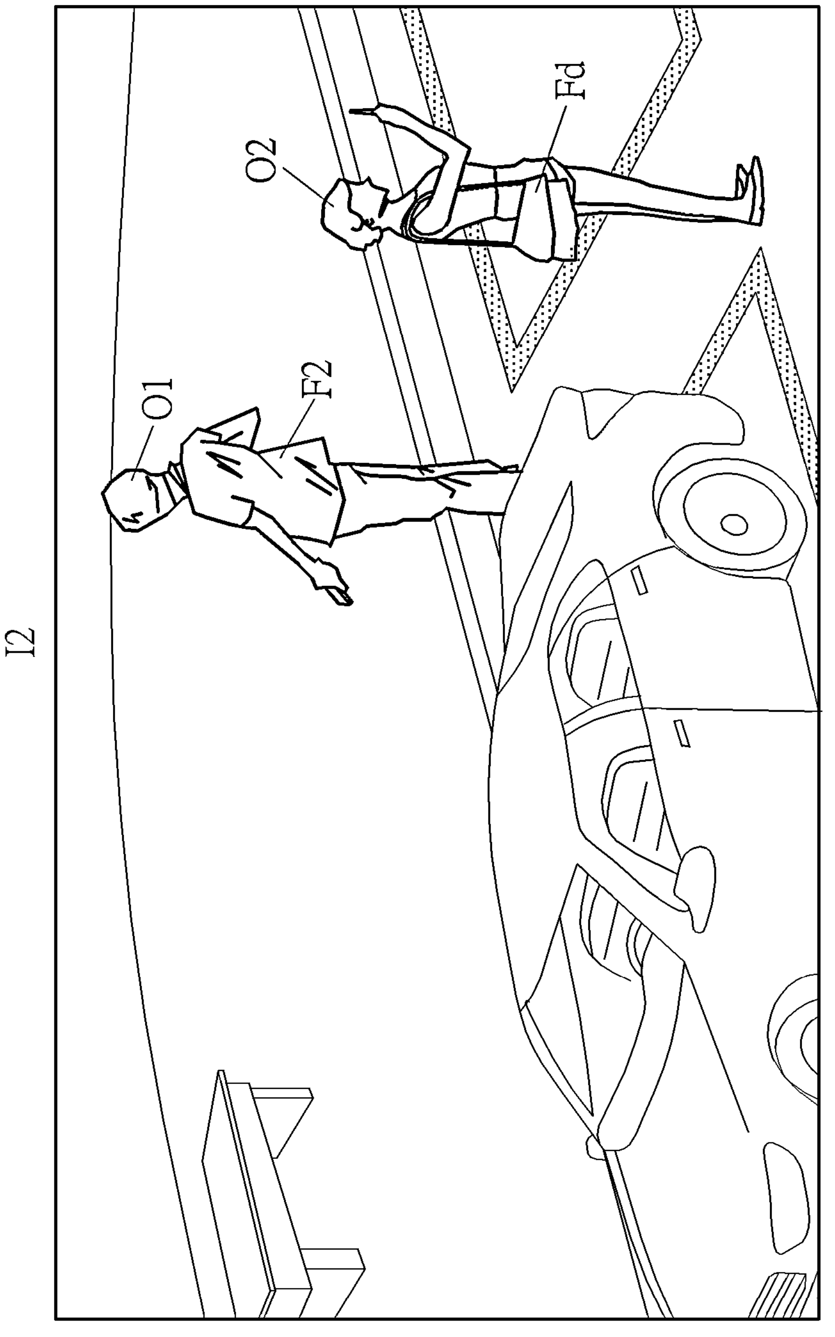
Figure 6:
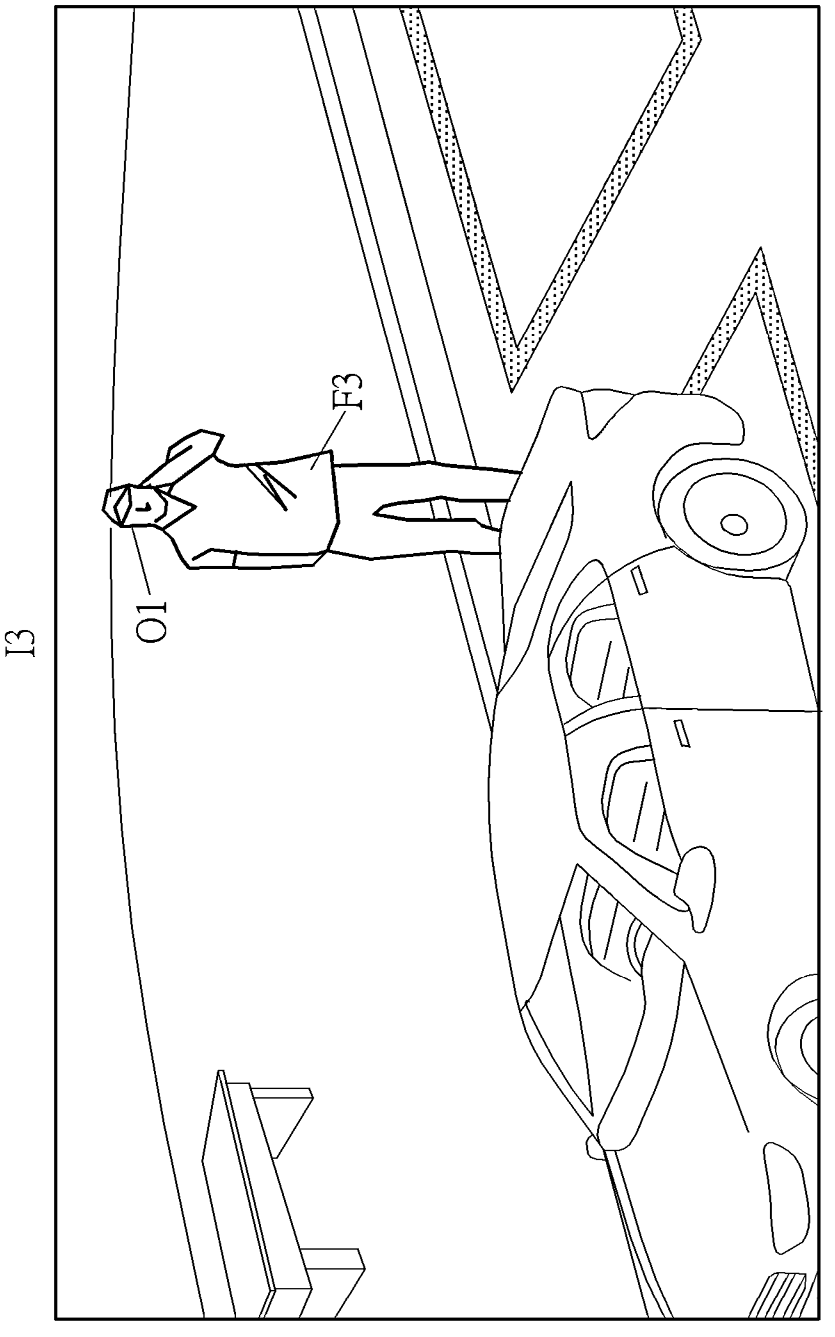

Please refer to FIG. 2 to FIG. 6. FIG. 2 is a flow chart of an image mode application method according to the embodiment of the present invention. FIG. 3 to FIG. 6 are diagrams of detection image of the image stream acquired by the surveillance apparatus 10 according to the embodiment of the present invention. The image stream can include a plurality of detection images generated in sequence, such as an initial detection image I0, a first detection image I1, a second detection image I2 and a third detection image I3. An application mode of the surveillance apparatus 10 can be changed in accordance with a result of the image mode application method. The application mode can include, but not be limited to, an image mode, an alarm modem, a transmission mode and/or a storage mode; this embodiment takes the image mode as an example. A generation point of time of the initial detection image I0 can be earlier than a generation point of time of the first detection image I1, the generation point of time of the first detection image I1 can be earlier than a generation point of time of the second detection image I2, and the generation point of time of the second detection image I2 can be earlier than a generation point of time of the third detection image I3.

For the image mode application method, Step S100 involves performing object identification within the image stream to determine the presence of the target object. The target object can be a pedestrian, a vehicle or other object. The embodiment can set the target object as the pedestrian, and the other object in the initial detection image I0 can be background information, and then step S102 can be executed to preset the application mode of the image stream as a first mode. The application mode (such as the image mode) can include, but not be limited to, an image quality adjustment mode, or a resolution adjustment mode, or a resolving power adjustment mode, or a frame rate adjustment mode. The first mode can be a normal standard mode, such as the low image quality adjustment mode, or the low resolution adjustment mode, or the low resolving power adjustment mode, or the low frame rate adjustment mode.

If the target object is appeared in the image stream, step S104 can be executed to detect a first target object O1 and a first feature F1 within the first detection image I1; step S104 can be an example that presets the first target object O1 is detected in the first detection image I1, and actual situation may detect the target object in the second detection image I2, or the third detection image I3, or other following detection image. A number of the target object detected in the detection image can be one or more, and possible variation of the target object and the detection image is omitted herein for simplicity. In addition, the first feature F1 can be relevant to the first target object O1, and can be selected from a group consisting of a behavior, a face feature, a clothing feature, a body feature of the first target object O1, and a combination thereof; actual application of the first feature F1 is not limited to the foresaid embodiment. The first feature F1 of the first target object O1 of the embodiment can be defined as the behavior of back-facing the image sensor 14, or the back feature. Relevance of the feature and the target object can be based on a label of the neural network; besides, the relevance of the feature and the target object can be further stored into a memory unit 16. The image mode application method can remove the relevance of the feature and the target object stored in the memory unit 16 when conforming to a preset time condition (such as two hours after the relevance is set, or a scheduled time is reached), so as to meet customized needs.

Because the new object and the new feature are detected within the image stream in step S104, step S106 can be executed to adjust the application mode of the image stream from the first mode to a second mode. The second mode can be a high standard mode, such as the high image quality adjustment mode, or the high resolution adjustment mode, or the high resolving power adjustment mode, or the high frame rate adjustment mode. Then, the image mode application method can apply the object identification for the next detection image of the image stream, and step S108 and step S110 can be executed to detect a second feature F2 of the first target object O1 within the second detection image I2, and to compare whether the second feature F2 conforms to the first feature F1. The second feature F2 can be relevant to the first target object O1, and can be the behavior, the face feature, the clothing feature or the body feature of the first target object O1.

The application mode of the present invention can include the normal standard mode that omits time and space information, and the high standard mode that retains more time and space information; actual application of the application mode is not limited to the foresaid embodiments. For example, the present invention can further include an ultra-high standard mode and/or other standard mode, and variation of the standard modes can depend on the design demand.

If the second feature F2 conforms to the first feature F1, the first target object O1 still has the same behavior or the same body feature in the second detection image I2 by comparing with the first detection image I1, and step S112 can be executed to adjust the application mode from the second mode (such as the high standard mode) to the first mode (such as the normal standard mode); that is to say, because the second detection image I2 does not have the new object (such as the first target object O1) or the new feature (such as the same back feature or the same back-facing behavior) by comparing with the first detection image I1, the image mode application method of the present invention can decrease image quality to reduce quantity of image transmission, and further to economize storage space of storing the images (such as image information in the memory unit 16). The memory unit 16 can be disposed inside the surveillance apparatus 10 and electrically connected to the operation processor 12.

If the second feature F2 does not conform to the first feature F1, the behavior or the body feature of the first target object O1 in the second detection image I2 are different from ones in the first detection image I1; for example, the body may turn to face the image sensor 14, so the new feature is appeared. Therefore, step S114 can be executed to keep the application mode in the second mode (such as the high standard mode). It should be mentioned that the new feature mentioned in the present invention can be a spatial feature, such as perspective change of the object (for example, the front, the side or the back of the object faces the image sensor 14), posture change (for example, the standing or sitting object), or accessory change (for example, putting on or taking off the hat, the mask and/or the backpack); the new feature may further be a timeline feature, such as position change (for example, the walking or running object), or behavior change (for example, the smoking or chatting object, or the object using the mobile phone). Practical application of the new feature is not limited to the foresaid embodiment.

In step S108, in addition to detecting the second feature F2 of the first target object O1 in the second detection image I2, a preset feature Fd of the second target object O2 may be further detected in the second detection image I2, and the image mode application method of the present invention can set different priorities in the foresaid two detection situations. For further explanation, when the second feature F2 of the first target object O1 detected in the second detection image I2 conforms to the first feature F1, the detection result can have a first priority; when the preset feature Fd of the second target object O2 is detected in the second detection image I2, the detection result can have a second priority. The second priority can be higher than the first priority. An order of the priorities may depend on factors such as repeatability or new and old condition of each feature. For example, the first priority with lower weight is generated because the second feature F2 conforms to the first feature F1, and the preset feature Fd is the feature newly appeared in the second detection image I2 so as to generate the second priority with higher weight. The judging criteria for the order of the priorities are not limited to the foresaid embodiment, and depend on the design demand. Therefore, when the foresaid two detection situations are detected in the second detection image I2, the application mode can be still kept in the second mode (such as the high standard mode) because the second priority is higher than the first priority. In this condition, although no new feature is appeared on the first target object O1 (which means the second feature F2 conforms to the first feature F1), the new object and the new object (such as the second target object O2 and the preset feature Fd) are further appeared, and the image mode application method can still keep the application mode in the second mode for acquiring the image information with clear details.

If several target objects (such as the first target object O1 and the second target object O2) are detected in the first detection image I1 and the second detection image I2, the image mode application method of the present invention can keep the application mode in the second mode when a new feature of at least one target object is appeared in the second detection image I2 that is not found in the first detection image I1. The image mode application method of the present invention can switch the application mode from the second mode to the first mode when all features of the all target objects are consistent in the first detection image I1 and the second detection image I2.

Then, the image mode application method can apply the object identification for the next detection image of the image stream; step S116 and step S118 can be executed to detect a third feature F3 of the first target object O1 within the third detection image I3, and comparing whether the third feature F3 conforms to the first feature F1 and the second feature F2. If the third feature F3 conforms to the first feature F1, or conforms to the second feature F2, or simultaneously conforms to the first feature F1 and the second feature F2, the third detection image I3 does not have the new feature, and step S120 can be executed to set the application mode in the first mode. If the third feature F3 does not conform to the first feature F1 or the second feature F2, the third detection image I3 may have the new feature, and step S112 can be executed to set the application mode in the second mode.

The relevance of the feature and the target object in the memory unit 16 can be removed when conforming to the preset time condition. For example, when the first target object O1 appears the behavior of taking off the mask set as the first feature F1 for the first time in the detection image captured at 8 a.m. on a certain day, step S100, step S104 and step S106 can be executed accordingly. In the following detection image, if the behavior of taking off the mask set as the first feature F1 is appeared again on the first target object O1, step S108, step S110 and step S112 (or step S116, step S118 and step S120) can be executed accordingly. At 1 p.m. of the certain day which meets the customized preset time condition, the operation processor 12 can remove the relevance of the feature and the target object stored in the memory unit 16. Therefore, after 1 p.m. of the certain day, if the first target object O1 appears the behavior of taking off the mask set as the first feature F1 again, the operation processor 12 can be initialized and back to step S100 because the relevance of the feature and the target object in the memory unit 16 is removed.

Figure 7:
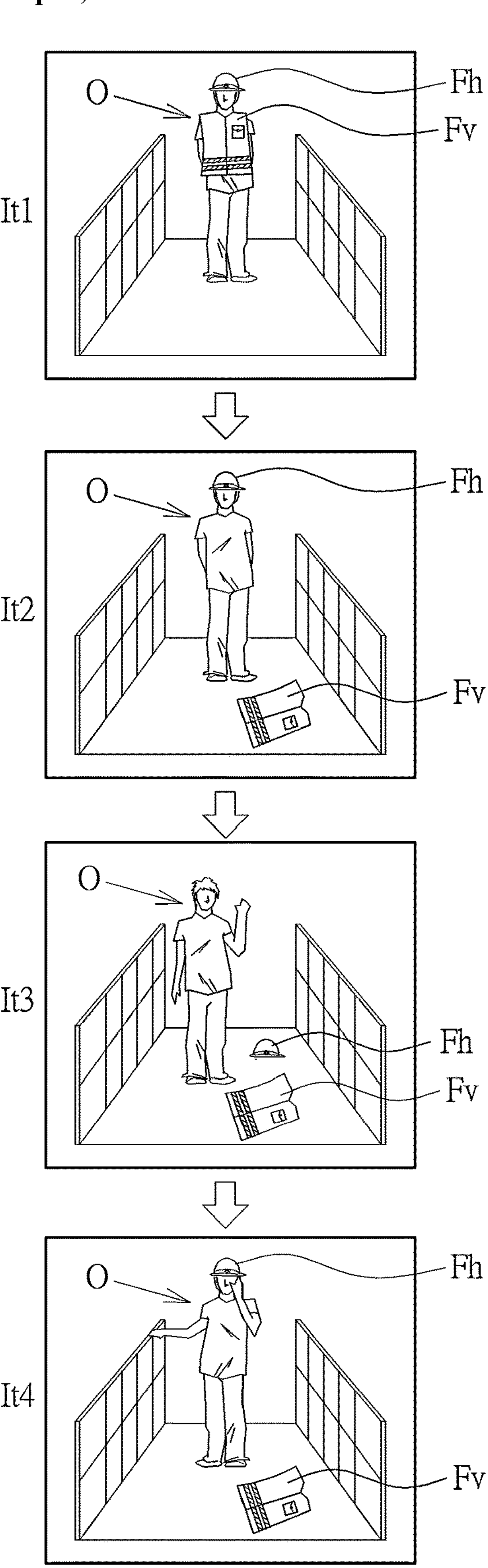
FIG. 7 is a diagram of switching the alarm mode due to the feature change of the image stream acquired by the surveillance apparatus according to the embodiment of the present invention.

Moreover, the application mode of the present invention can be further designed as the alarm mode; the first mode of the alarm mode can be an alarm shutdown mode, and the second mode of the alarm mode can be an alarm generation mode. The alarm generation mode is not limited to alarms in a visual form, an optical form, an acoustic form or a vibration form. The alarm can be generated and displayed when the surveillance image contains the first target object O1 appearing the first feature F1 (such as the behavior of taking off the mask). The image mode application method of the present invention can switch the application mode into the second mode (such as the alarm generation mode) for generating the alarm when the feature is appeared for the first time, and further can switch the application mode into (or keep the application mode in) the first mode (such as the alarm shutdown mode) to prevent noise or other interference when the feature is appeared repeatedly. Please refer to FIG. 7. FIG. 7 is a diagram of switching the alarm mode due to the feature change of the image stream acquired by the surveillance apparatus according to the embodiment of the present invention.

As shown in FIG. 7, the detection images It1, It2, It3 and It4 can be several detection images of the image stream acquired in sequence. The target object O in the detection image It1 can have a helmet feature Fh and a safety vest feature Fv. If the target object O takes off the safety vest (which means the safety vest feature Fv is changed) in the detection image It2, the image mode application method can determine an overall feature change is produced (which means the second feature F2 does not conform to the first feature F1 in the foresaid embodiment), and the application mode can be switched into the second mode (such as the alarm generation mode) for generating the alarm. Then, if the target object O further takes off the helmet (which means the helmet feature Fh is changed) in the detection image It3, the image mode application method can also determine the overall feature change is produced (which means the second feature F2 does not conform to the first feature F1 in the foresaid embodiment), so that the application mode can be kept in the second mode (such as the alarm generation mode). If the target object O puts on the helmet in the detection image It4, the overall feature at this time can be recovered to the overall feature appeared previously (such as the second feature F2 conforms to the first feature F1 in the foresaid embodiment), and the application mode can be switched into the first mode (such as the alarm shutdown mode).

Therefore, the image mode application method and the surveillance apparatus of the present invention can set the application mode in the first mode (such as the alarm shutdown mode) when the feature is appeared repeatedly; for example, the detection image It4 belongs to a situation where the second feature F2 conforms to the first feature F1 by comparing with the detection image It2. The prior art may consider that the detection image It4 has a condition of feature change by comparing with the detection image It3, and the alarm is continuously generated to result in the noise or other interference; the present invention can improve the drawback in the prior art effectively.

Step S110 and step S100 are executed for feature conforming comparison, which can utilize cluster analysis, neural network architecture, or other technology with similar functions to perform comparison and analysis; step S110 is used as an example herein for explanation, however, it should be mentioned that its practical application is not limited to the following embodiment. The image stream may include several initial detection images I0 that are captured before the first detection image I1 and contain the first target object O1 just walking into the image frame. The first target object O1 may walk a certain distance to reach a center of the image frame for generating the first detection image I1, and the image mode application method of the present invention can collect a plurality of previous feature vectors of the first target object O1 within a plurality of previous detection images of the image stream during a preset period to form at least one cluster; in this situation, the preset period can be defined as a time period between a point of time when the first target object O1 just enters the image frame and a point of time when the first target object O1 reaches the center of the image frame, the previous detection image can be defined as the initial detection image I0 that is captured before the first detection image I1, and the feature vector can be extracted by common feature extraction technology so as to form one or some clusters for the feature comparison.

Then, the image mode application method of the present invention can acquire a current feature vector of the first target object O1 within the current detection image that is captured after the previous detection images, and compute a distance of the current feature vector relative to the previously-formed cluster. If the distance of the current feature vector relative to the cluster is smaller than a preset threshold, the current detection image does not have the new feature by comparing with the previous detection image, and the image stream can be adjusted or kept in the existed mode (such as the first mode) of the previous detection image. If the distance of the current feature vector relative to the cluster is greater than or equal to the preset threshold, the current detection image has the new feature that is not appeared in the previous detection image, and the image stream can be adjusted to the second mode that is different from the previous detection image; in the meantime, the current detection image can be defined as the first detection image I1, and the preset threshold can be set and adjusted in accordance with a system default value and a training update value.

That is to say, the image mode application method of the present invention can continuously apply the feature conforming comparison for all the detection images of the image stream. If one current detection image does not have the new feature by comparing with the previous detection image, the current detection image can be defined as the previous detection image, and the image stream can be set in the first mode to reduce the quantity of the image transmission and to economize the storage space of storing the image, and can further acquire the next current detection image for execution of the same feature conforming comparison. If one detection image (which means the current detection image) has the new feature that is not appeared in the previous detection image, the image stream can be set in the second mode to provide the image information with the clear details.

Figure 8:
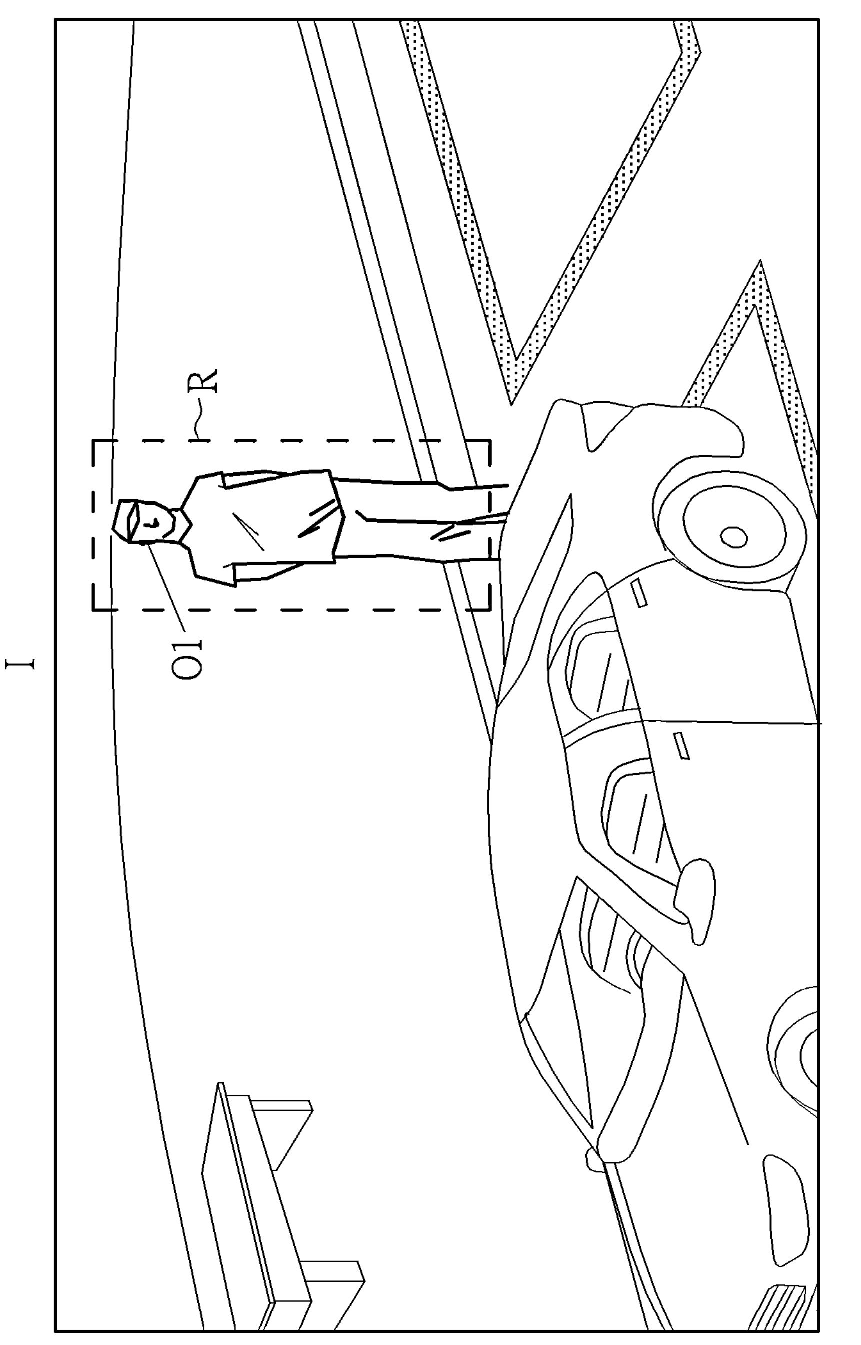
FIG. 8 is a diagram of the detection image I acquired by the surveillance apparatus according to another embodiment of the present invention.

Please refer to FIG. 8. FIG. 8 is a diagram of the detection image I acquired by the surveillance apparatus 10 according to another embodiment of the present invention. The surveillance apparatus 10 of the present invention can optionally utilize object identification technology to set a region of interest R corresponding to the first target object O1 within each detection image I of the image stream for the foresaid image mode application method. If one detection image I has the new feature that is not appeared in other detection images I, the image mode application method of the present invention can optionally switch the application mode of the region of interest R from the first mode to the second mode, which means some pixels (such as pixels within the region of interest R) of the detection image I in the image stream can be adjusted for further decreasing image information stored inside the memory unit 16. If one detection image I does not have the new feature (such as the second feature F2 conforms to the first feature F1 in the foresaid embodiment) by comparing with other detection images I, the application mode of the region of interest R can be adjusted or kept in the first mode.

In addition, in one possible embodiment of the present invention, the image sensor 14 may simultaneously provide a plurality of image streams (such as the image streams in the normal standard mode and in the high standard mode) towards the operation processor 12, and the surveillance apparatus 10 can decide that a recording mode of the image stream is stored in the memory unit 16 via the normal standard mode or the high standard mode in accordance with the feature conforming result of the image mode application method, so as to achieve an aim of economizing the storage space required to store the images. For example, the application mode can be switched into the second mode (such as the high storage mode) for storing the image stream in the high standard mode when the new feature is detected, and the application mode can be further switched into the first mode (such as the low storage mode) for storing the image stream in the normal standard mode when no new feature is detected. Generally, the surveillance apparatus 10 can regularly store the image stream in the normal standard mode into the memory unit 16, and can further store the image stream in the high standard mode into the memory unit 16 when the new object or the new feature is detected by the image mode application method of the present invention.

In other possible embodiment of the present invention, the image sensor 14 can provide the single image stream capable of being switched between different image modes (such as the image stream set in the normal standard mode, or the image stream set in the high standard mode), and the surveillance apparatus 10 can decide the transmission mode of the image stream is executed in the normal standard mode or the high standard mode in accordance with a result of whether the image mode application method of the present invention detects the new object or the new feature, and the image stream (may be switched in the normal standard mode or the high standard mode in accordance with the feature conforming result) that is transmitted to backend can be stored in the memory unit 16; that is to say, this embodiment can switch the application mode into the second mode (such as the high transmission quantity mode) to transmit the image stream in the high standard mode when the new feature is detected, and can switch the application mode into the first mode (such as the low transmission quantity mode)

to transmit the image stream in the normal standard mode when no new feature is detected.

In conclusion, the image mode application method and the surveillance apparatus of the present invention can analyze the new feature of the target object within the detection image to decide the application mode of the image stream. If the detection image has the same target object but no new feature, the alarm is not generated, and the image stream can be set in the normal standard mode to reduce the quantity of the image transmission and to economize the storage space of storing the image. If the detection image has the same target object and the new feature, the alarm is generated, and the image stream can be set in the high standard mode for providing more image information. Comparing to the prior art, the present invention can no longer generate the alarm when the detection image has the moving object with the same behavior or the specific object remaining stationary, and switch the image stream into the normal standard and/or shut down the alarm, so as to reduce the quantity of the image transmission and further to economize the storage space of storing the image.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An image mode application method applied to a surveillance apparatus with an operation processor, the operation processor receiving an image stream having a first detection image and a second detection image generated in sequence, the image mode application method comprising:

the operation processor detecting a first feature of a first target object within the first detection image;

the operation processor switching an application mode of the surveillance apparatus from a first mode to a second mode in accordance with a detection result of the first feature;

the operation processor detecting a second feature of the first target object within the second detection image;

the operation processor determining whether the second feature has changed relative to the first feature; and the operation processor switching the application mode from the second mode to the first mode when the first target object within the second detection image is the same as the first target object within the first detection image but the second feature is not changed relative to the first feature;

wherein the image mode application method further comprises:

the operation processor collecting a plurality of previous feature vectors of the first target object within a plurality of previous detection images of the image stream during a preset period for forming at least one cluster;

the operation processor acquiring a current feature vector of the first target object within at least one current detection image of the image stream;

the operation processor computing a distance of the current feature vector relative to the at least one cluster; and the operation processor setting the image stream in the first mode when the foresaid distance is smaller than a preset threshold, or setting the image stream in the second mode when the foresaid distance is greater than or equal to the preset threshold.

2. The image mode application method of claim 1, wherein the first feature is relevant to the first target object, the first feature of the first target object is a behavior, a face feature, a clothing feature or a body feature.

3. The image mode application method of claim 1, further comprising:

the operation processor determining whether a preset feature of a second target object is detected within the second detection image; and the operation processor keeping the application mode in the second mode when the preset feature is detected within the second detection image and the second feature of the first target object conforms to the first feature;

wherein the preset feature does not appear on the first detection image.

4. The image mode application method of claim 1, wherein the operation processor receives the image stream having the first detection image, the second detection image and a third detection image generated in sequence, the image mode application method further comprising:

the operation processor detecting a third feature of the first target object within the third detection image;

the operation processor comparing the third feature with the first feature and the second feature; and the operation processor setting the application mode in the first mode when the third feature conforms to the first feature, or conforms to the second feature, or conforms to the first feature and the second feature simultaneously.

5. The image mode application method of claim 1, further comprising:

the operation processor setting a region of interest corresponding to the first target object within each detection image of the image stream; and the operation processor setting the region of interest in the second mode and storing the region of interest into a memory unit in accordance with the detection result;

wherein the memory unit is electrically connected to the operation processor.

6. The image mode application method of claim 5, further comprising:

the operation processor switching the region of interest from the second mode to the first mode when the second feature conforms to the first feature.

7. The image mode application method of claim 1, wherein the image stream is a single stream, the operation processor decides a transmission mode of the single stream in the first mode or the second mode in accordance with a feature conforming result.

8. The image mode application method of claim 1, further comprising:

the operation processor acquiring the image stream having both the first mode and the second mode; and the operation processor storing the image stream having the first mode or the second mode into a memory unit in accordance with a feature conforming result;

wherein the memory unit is electrically connected to the operation processor;

wherein the image stream comprises two streams with different modes, the operation processor decides a recording mode of the two streams in accordance with a feature conforming result.

9. The image mode application method of claim 1, wherein the application mode comprises an image mode, an alarm mode, a transmission mode and/or a storage mode, the image mode comprises an image quality adjustment mode or a resolution adjustment mode or a resolving power adjustment mode or a frame rate adjustment mode, the alarm mode comprises an alarm generation mode and an alarm shutdown mode, the transmission mode comprises a high transmission quantity mode and a low transmission quantity mode, the storage mode comprises a high storage mode and a low storage mode.

10. A surveillance apparatus comprising:

an operation processor adapted to acquire an image stream having a first detection image and a second detection image generated in sequence, detect a first feature of a first target object within the first detection image, switch an application mode of the surveillance apparatus from a first mode to a second mode in accordance with a detection result of the first feature, detect a second feature of the first target object within the second detection image, determine whether the second feature has changed relative to the first feature, and switch the application mode from the second mode to the first mode when the first target object within the second detection image is the same as the first target object within the first detection image but the second feature is not changed relative to the first feature;

wherein the operation processor is adapted to further collect a plurality of previous feature vectors of the first target object within a plurality of previous detection images of the image stream during a preset period for forming at least one cluster, acquire a current feature vector of the first target object within at least one current detection image of the image stream, compute a distance of the current feature vector relative to the at least one cluster, and set the image stream in the first mode when the foresaid distance is smaller than a preset threshold, or set the image stream in the second mode when the foresaid distance is greater than or equal to the preset threshold.

11. The surveillance apparatus of claim 10, wherein the first feature is relevant to the first target object, the first feature of the first target object is a behavior, a face feature, a clothing feature or a body feature.

12. The surveillance apparatus of claim 10, wherein the operation processor is adapted to further determine whether a preset feature of a second target object is detected within the second detection image, and keep the application mode in the second mode when the preset feature is detected within the second detection image and the second feature of the first target object conforms to the first feature, the preset feature does not appear on the first detection image.

13. The surveillance apparatus of claim 10, wherein the operation processor receives the image stream having the first detection image, the second detection image and a third detection image generated in sequence, the operation processor is adapted to further detect a third feature of the first target object within the third detection image, compare the third feature with the first feature and the second feature, and setting the application mode in the first mode when the third feature conforms to the first feature or conforms to the second feature or simultaneously conforms to the first feature and the second feature.

14. The surveillance apparatus of claim 10, wherein the operation processor is adapted to further set a region of interest corresponding to the first target object within each detection image of the image stream, and set the region of interest in the second mode and storing the region of interest into a memory unit in accordance with the detection result, the memory unit is electrically connected to the operation processor.

15. The surveillance apparatus of claim 14, wherein the operation processor is adapted to further switch the region of interest from the second mode to the first mode when the second feature conforms to the first feature.

16. The surveillance apparatus of claim 10, wherein the image stream is a single stream, the operation processor decides a transmission mode of the single stream in the first mode or the second mode in accordance with a feature conforming result.

17. The surveillance apparatus of claim 10, wherein the operation processor is adapted to further acquire the image stream having both the first mode and the second mode, and store the image stream having the first mode or the second mode into a memory unit in accordance with a feature conforming result, the memory unit is electrically connected to the operation processor, the image stream comprises two streams with different modes and the operation processor decides a recording mode of the two streams in accordance with a feature conforming result.

18. The surveillance apparatus of claim 10, wherein the application mode comprises an image mode, an alarm mode, a transmission mode and/or a storage mode, the image mode comprises an image quality adjustment mode or a resolution adjustment mode or a resolving power adjustment mode or a frame rate adjustment mode, the alarm mode comprises an alarm generation mode and an alarm shutdown mode, the transmission mode comprises a high transmission quantity mode and a low transmission quantity mode, the storage mode comprises a high storage mode and a low storage mode.

* * * * *